(No Model.)
A. H. WILSON.
WATERING TROUGH.
No. 567,672.  Patented Sept. 15, 1896.
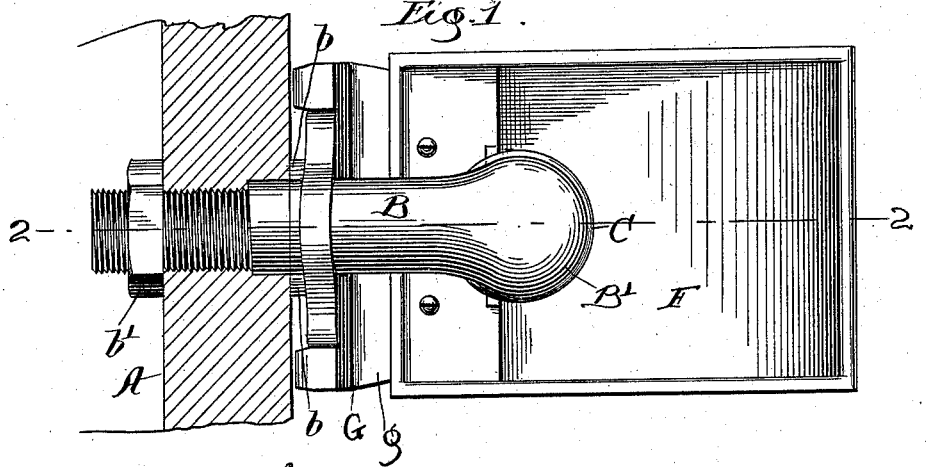
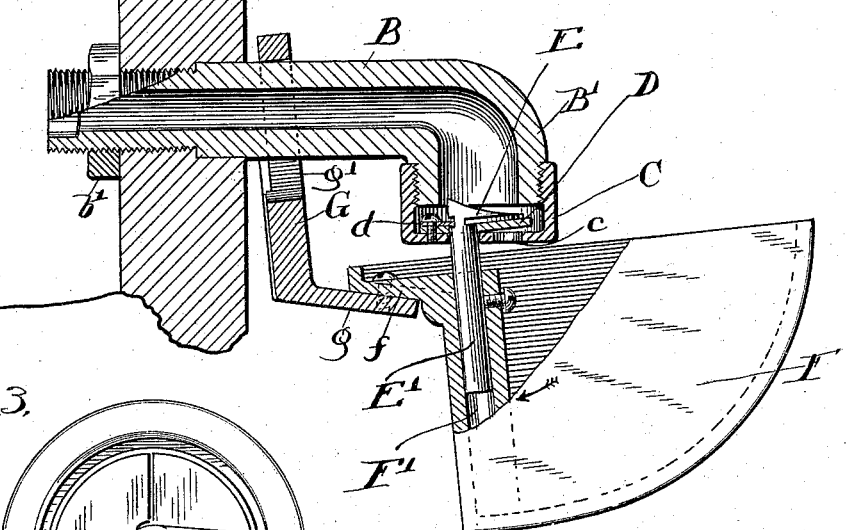
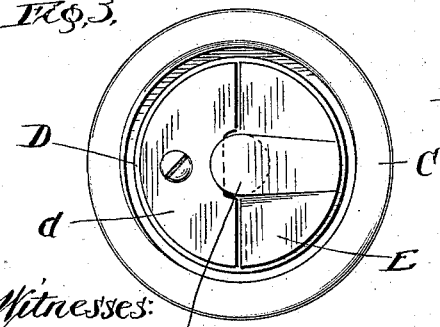
Witnesses:
Inventor:
Amasa H Wilson

United States Patent Office.

AMASA H. WILSON, OF CHICAGO, ILLINOIS.

WATERING-TROUGH.

SPECIFICATION forming part of Letters Patent No. 567,672, dated September 15, 1896.

Application filed August 9, 1895. Serial No. 558,732. (No model.)

*To all whom it may concern:*

Be it known that I, AMASA H. WILSON, a citizen of the United States of America, residing at Chicago, in the county of Cook and State of Illinois, have invented certain new and useful Improvements in Watering-Troughs, of which the following is a specification.

My invention relates to improvements in watering-troughs of that class adapted to supply water to stock, the object of the invention being to provide a simple and effective means for preserving a practically constant level of water in a trough, the water being furnished from a large tank or other source of permanent supply.

The invention is fully described and explained in this specification and shown in the accompanying drawings, in which—

Figure 1 is a top plan of a watering-trough embodying my improvements, together with the parts connecting it with a tank. Fig. 2 is a view of the trough and its connections, partly in side elevation and partly in vertical section, the plane of section being through the line 2 2, Fig. 1. Fig. 3 is a top plan of the cap at the lower end of the feed-pipe and the valve resting upon said cap.

In the drawings, A represents a portion of the side wall of a tank, of any desired construction, and B is a horizontal discharge-pipe seated in the side wall of the tank and adapted to supply water to a trough, as hereinafter set forth. The pipe B is preferably provided with two flanges $b$ $b$, Fig. 1, adapted to rest against the outer face of the wall of the tank, and a nut $b'$ may be mounted on the inner end of the pipe and screwed tightly against the wall of the tank to hold the pipe in place. The outer end B' of the pipe is turned downward and externally screw-threaded to receive a cap C, which forms a chamber and valve-seat, as hereinafter explained, the end of the pipe being preferably enlarged as compared with its horizontal portion. On the cap C rests a rubber washer D, preferably covering substantially the entire surface of the cap and held in place by a metal plate $d$, resting on the corresponding portion of the washer and screwed to the cap, as shown in Figs. 2 and 3. The plate $d$, as shown, covers substantially one half of the washer D, the other half of the washer being covered by a second plate E, securely fastened to it and provided with an arm E', extending downward through a hole approximately in the center of the cap C, the hole being of such size as to permit limited oscillation of the arm E' with the free portion of the washer D. As shown in Fig. 2, the plate E and its arm E' are in such a position that the free portion of the washer D is raised somewhat above the cap, so as to uncover an opening $c$ in the cap, but evidently if the arm E' be swung in the direction indicated by the arrow in Fig. 2 this movement of the arm will draw the plate E and the free portion of the washer D downward and close the opening $c$.

Upon the arm E' is suspended a trough F, preferably of the general shape indicated in Figs. 1 and 2, the connection of the arm and trough being preferably by means of a tubular socket F', integral with the trough and encircling the stem, the arm being held in place by means of a set-screw, as shown in Fig. 2. To the rear upper edge of the trough is fastened a weight G, secured in place in any desired manner, but preferably by means of an approximately horizontal flange $g$, in contact with a flange $f$, projecting backward from the upper edge of the trough, the two flanges being held together by screws. The main portion of the weight is preferably approximately vertical, as shown, and is formed with an opening $g'$, encircling the horizontal part of the pipe B, and of such size as to permit oscillation of the trough and weight about the center of suspension of the arm E'—that is, about the hinge-line of the free portion of the washer D. The weight G is so proportioned to the weight of the trough F and the space therein that when the trough is filled with water to a certain predetermined level the trough and its contents are sufficiently heavy to overbalance the weight G, the trough being swung downward and the arm being moved in the direction indicated by the arrow in Fig. 2, so as to depress the valve and close the opening $c$ in the cap C. When, however, the water in the trough sinks below the predetermined level, the trough and its contents are sufficiently lightened to be overbalanced by the weight C, and thus to be raised to the position shown in Fig. 2, whereby the valve is lifted and the opening c opened to permit the escape of water from the tank through the supply-pipe B into the trough. The trough thus evidently controls automatically its water supply, and I have found in practice that under all conditions it maintains a practically uniform level of water so long as the water supply in the tank continues.

As shown in Fig. 2, the upper margin of the opening g' in the weight G rests upon the pipe B and limits the downward movement of the weight and the upward movement of the trough. When the trough, upon being filled with water to the predetermined level, tips downward, the lower margin of the opening g' strikes the pipe and limits the oscillation of the trough in that direction.

Having now described and explained my invention, what I claim as new, and desire to secure by Letters Patent, is—

1. The combination with the pipe, B, having the chamber, C, of the washer, D, secured in said chamber and covering an opening in the bottom thereof, the plate, E, fastened to the free portion of said washer and provided with the downwardly-projecting arm, E', and the trough, F, supported upon said stem and free to oscillate therewith, the center of gravity of the trough being on one side of its axis of oscillation when the trough is filled with water to a certain level, and on the other side of said axis when the water falls below said level, and the oscillation of the trough being governed by the level of water within it, and being adapted to open and close the valve.

2. The combination with the pipe, B, and chamber, C, of the valve arranged substantially as described and provided with the downwardly-projecting stem, E', the trough, F, supported upon the stem, and the counterbalancing-weight, G, fastened to the trough, the trough being adapted to oscillate about its point of suspension in accordance with the amount of water contained in it, and its oscillation being adapted to open and close the valve and thus to govern its water supply.

3. The combination with the discharge-valve of a tank or other source of supply, of a trough adapted to receive water through said valve, a valve-stem connecting said valve with the trough and adapted to support said trough, the oscillation of the trough being adapted to open and close said valve, and a weight attached to the trough and adapted to oscillate it in one direction when the trough is empty, but to be overbalanced by the weight of the trough when filled with water to a predetermined level, whereby the position of the trough and the valve may be controlled by the level of the water in the trough.

AMASA H. WILSON.

Witnesses:
  R. H. WILES,
  O. L. PLUMTREE.